Jan. 16, 1962 H. S. KOLETSKY ET AL 3,017,524

STABILIZED TRANSISTOR MULTIVIBRATOR

Filed Dec. 31, 1959

*INVENTORS*
*HAROLD S. KOLETSKY*
MURRY W. BERKOWITZ
by Leonard H. King

United States Patent Office 3,017,524

Patented Jan. 16, 1962

3,017,524

STABILIZED TRANSISTOR MULTIVIBRATOR

Harold S. Koletsky, Syosset, and Murry W. Berkowitz, Flushing, N.Y., assignors to Avien, Inc., Woodside, N.Y.

Filed Dec. 31, 1959, Ser. No. 863,145
3 Claims. (Cl. 307—88.5)

This invention has reference to transistor relaxation oscillators and in particular to transistorized multivibrator circuits and the like which are stabilized to provide substantially uniform performance and cutoff conditions over a wide range of temperatures.

The operating characteristics of transistors made of typical semiconductor materials such as germanium, silicon, and the like, will vary with the ambient temperature and, in particular, with the temperature at the junctions within the transistor.

As a rough rule of thumb, the transistor characteristic known as collector cutoff current, that is the leakage current from collector to base when a transistor is cut off by reverse emitter bias and which is designated $I_{co}$, doubles with every 11° C. rise in temperature. As a result the current through, and the voltage across, a serially connected base resistor will also double with every 11° C. rise in temperature. This voltage can reduce the reverse bias to the point where conduction occurs. Accordingly, a transistor multivibrator circuit, wherein conduction and non-conduction must be controlled, requires a suitable bias source which will maintain the desired cutoff conditions during ascending and descending ambient temperatures.

In aircraft instrumentation, where transistorized multivibrators find frequent use, an extended range of temperature environmental condition exist. Aircraft are frequently subjected to a temperature range of −55° C. to +70° C. An additional complication is introduced by the subjection of the instrumentation equipment to operating temperatures substantially above the ambient temperature of the aircraft due to the heat of the engine, electrical heat losses within the aircraft equipment, frictional heating of the aircraft skin, etc. As a result the operating ambient temperature for electronic equipment of +90° C. is not uncommon. Under such conditions, the cutoff current in the collector of a typical germanium transistor may vary from a minimum to a maximum by a ratio of 1 to 64.

It is accordingly one object of this invention to provide a novel transistorized multivibrator circuit for consistent performance over a wide range of temperatures.

It is a more particular object of this invention to provide a unique transistorized multivibrator circuit wherein the effects of changes in the collector cutoff current due to temperature are eliminated to provide consistent operation over a wide range of temperatures.

It is another object of this invention to provide novel biasing means for the transistors in a multivibrator which will produce a bias in excess of the voltage change introduced by temperature induced variation of the collector cutoff current.

It is still another object of the invention to provide biasing means for the transistors employed in a transistorized multivibrator wherein consistent performance of the multivibrator is maintained over a wide range of temperatures; despite the effect of temperatures upon the collector current cutoff of the transistors; while maintaining a substantially constant gain in each transistor and while substantially maintaining constant the power requirements of the system.

It is a further object of the invention to provide a unique transistor multivibrator for use in an aircraft, wherein the effects of temperature upon the collector current cutoff are compensated by a single passive element.

It is a still further object of the invention to provide biasing means for the commonly connected emitters within a multivibrator circuit which is capable of operation over a wide range of temperatures and capable of responding to a low level triggering signal over the temperature range.

Other objects and advantages of the invention will become apparent from the remainder of the specification.

In accordance with this invention there is provided a diode as biasing means in a multivibrator in lieu of an emitter biasing resistor. As the dynamic forward resistance of a diode is quite small, an insignificant loss results. If the diode dynamic impedance were of the order of one ohm, it would represent a small percentage of the total circuit impedance.

The novel features of the invention are pointed out with particularity in the claims forming a part of this specification. For a better understanding of the invention, reference should be had to the accompanying drawing and descriptive matter wherein a preferred embodiment of the invention is illustrated.

Figure 1:
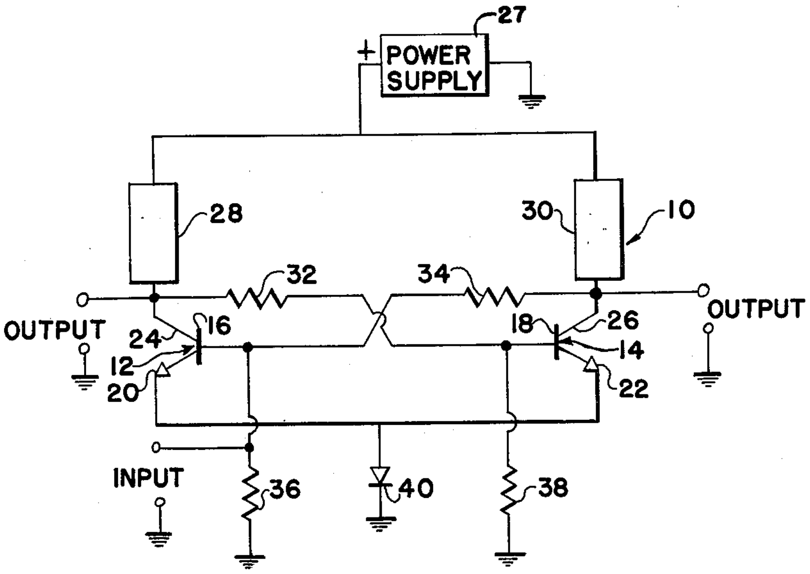
FIGURE 1 is a schematic circuit diagram of a bistable multivibrator wherein the invention is utilized.

Referring now to the drawing, wherein like parts are designated by identical numerals, there is shown a multivibrator generally designated 10 and comprised principally of a pair of germanium NPN transistors 12 and 14 having respectively base electrodes, or bases 16 and 18, emitter electrodes, or emitters, 20 and 22, and collector electrodes, or collectors, 24 and 26. A pair of load impedances 28 and 30 which need not be equal and may be of any suitable type, and which in this case are solenoid coils for relays are interconnected as shown from the respective collectors 24 and 26 to a suitable power supply 27, which serves as source of B+ voltage, such as a 22½ v. dry battery having its negative terminal connected to ground. A first coupling resistor 32 interconnects the collector 24 to the base 18 and a second coupling resistor 34 interconnects the collector 26 to the base 16. A pair of ground connected base resistors 36 and 38 are conventionally connected to bases 16 and 18 respectively. A semiconductor biasing diode 40, preferably of silicon, is connected to both emitter electrodes at one side and to ground at the other. The diode 40, generally, is poled for easy current flow of the major current in the emitter; thus in the embodiment shown diode 40 is poled for easy current flow from emitter to ground. It is conventional in a circuit of this type to use a biasing resistor in place of the diode 40. A signal input circuit is connected as shown to the base 16 of transistor 12.

The parameters for operation of the circuit are conventionally chosen so as to render only one of the transistors conductive at any time in response to the input signal. That is the multivibrator is connected to be operative in one of two stable conditions and is alternately switchable from one stable condition to the other.

When the D.C. bias is sufficiently positive, even if but momentarily, transistor 12 will be conductive and the potential at the collector 24 will decrease, thus immediately decreasing the potential at base electrode 18, as a result of the voltage drop across resistor 32 to a potential sufficiently low as to render transistor 14 substantially non-conductive. As was suggested above, the resistors 32 and 38 are conveniently chosen for operation with the particular transistor 14 at a normal ambient temperature. The conductive condition of transistor 12 and the non-conductive condition of transistor 14 continue until a signal is impressed upon base electrode 16 to cut off conduction of the transistor 12, whereby the voltage at collector 24 is raised and the voltage at base 18 is increased to a potential where conduction of transistor 14 is initiated. As a result, the voltages at the collector 26 and the base 16 are further decreased and maintain the transistor 12 non-conductive.

During the cutoff period, the non-conductive condition of either transistor, both the collector and base are reversed biased. A rise in temperature may, however, cause both transistors to be so conductive, as a result of raised collector cutoff current, as to produce a condition when both transistors conduct simultaneously. This occurs, for example, when transistor 12 conducts, but because of the increased collector cutoff current in transistor 14, the reduced voltage at collector 24 and base 18 is still sufficient to cause conduction in the heated transistor 14.

The problem is only partially remedied by the conventional use of a resistor in the place of the diode 40. Any resulting increase in emitter current will then reduce the forward bias on the respective emitters and decrease their tendency to become conductive. The value of such a resistor is dependent on the range of temperatures within which the circuit 10 operates. If the temperature range is extensive and the resistance is too low, the circuit will again be inoperative at the upper limits of temperature. If the resistance is too high the circuit may require a high level triggering signal as a result of reduced gain within the system and the signal power requirements may be increased and perhaps doubled.

The diode 40, as connected, provides bias to compensate for the voltage change introduced by variation in the collector cutoff current and produces stable multivibrator operation over an extensive range.

Figure 2:
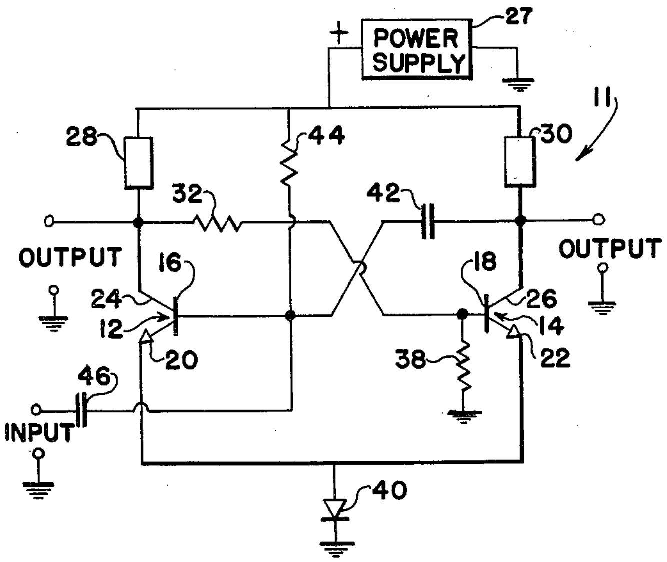
FIGURE 2 is a schematic circuit diagram of a monostable flip-flop wherein the invention is advantageously utilized.

Referring to FIGURE 2, there is shown a circuit 11 similar to the embodiment of FIGURE 1, wherein a capacitor 42 replaces the coupling resistor 34 to produce a monostable or "one shot" multivibrator, i.e., one wherein a stable condition exists prior to triggering. The unexcited circuit is characterized by one conducting and one non-conducting transistor. A trigger flips the circuit to an unstable condition, by reversing the conductive states of the transistors, in which it remains for a predetermined period before automatically returning to its stable condition. The period is determined by the values of capacitor 42 and the associated resistors. One of these is a base bias resistor 44 connected as shown to power supply. The loads 28 and 30 are here embodied in the form of resistors. A capacitor 46 couples a negative input trigger to the base 18. The operation of monostable flip-flops is well known and described in the literature.

Generally, and in the normally operative condition of the embodiment of FIGURE 2, the transistor 12 is suitably biased at the base by the resistor 44 so as to be conductive when no signal is applied to capacitor 46. The collector 24 of the transistor 12 is thus maintained at a reduced potential by virtue of the current flowing through the resistor 28; the former, in combination with the resistors 32 and 38, causes the base 18 of transistor 14 to be biased below its cutoff point. As little current flows through the resistor 30, the collector 26 and base 16 carry a comparatively high potential. Circuit 11 is stable in this state.

A suitable negative pulse upon the base 16 causes the transistor 12 to be biased to cutoff whereby the potential of collector 24 is suddenly raised. A corresponding rise in potential thus occurs simultaneously at the base 18, rendering the transistor 14 conductive and reducing the voltage at the collector 26. The base 16 is then driven to an even more negative potential, causing transistor 12 to remain in its cutoff condition. The multivibrator 11 is then passing through its unstable condition.

Capacitor 42, by virtue of the voltage changes effected, characteristically charges at a rate determined by resistors 30, 44 and the internal impedances of the transistors. When the voltage at the base 16 of the transistor 12 is eventually raised to a sufficient value by the charging process of the capacitor 42, the transistor 12 will conduct, thus reducing the potentials at the collector 24 and the base 18. The transistor 12 is thereby rendered non-conductive, raising the potential at the collector 26 and base 16 to cause even greater conduction by the transistor 12. Circuit 11 has thus reverted to its stable state.

As can be readily noted the cutoff conditions of the transistors in both FIGURES 1 and 2 are critical to the operation of the multivibrator. The output of both multivibrators described is conventionally and advantageously taken from elements 28 and 30.

It will be noted that the diode 40 effectively biases the transistors 12 and 14 to prevent excessive changes in the collector cutoff current of both over a wide temperature range; and accordingly provides for consistent performance of the multivibrators by preventing the changing of the transistor in the "off" condition to its "on" condition.

The function of the diode 40 in this embodiment is identical to that in the embodiment of FIGURE 1.

While the use of NPN transistors has been shown, it is to be understood that PNP type transistors may be employed provided the diode 40 connections are reversed.

Having thus disclosed our invention; what is claimed is:

1. A transistor multivibrator comprising a unidirectional voltage source, a pair of transistor devices of like conductivity each including a base electrode, an emitter electrode, and a collector electrode, low impedance means connecting said emitter electrodes, a semi-conductor diode, connected to said low impedance means and said source, said diode being poled for easy current flow of the major emitter current, independent load impedance means connected to each of said collector electrodes and said source, and feedback means connecting the base electrode of one transistor to the collector electrode of the other of said transistors.

2. A transistor multivibrator for operation in an extensive frequency range independently of ambient temperature, comprising a pair of transistors of like conductivity, each including a base electrode, an emitter electrode and a collector; a source of unidirectional current; a load connected to each of said collectors and said source; circuit means connecting the collector of a first of said transistors to one of the electrodes of the other of said transistors; circuit means connecting the collector of the other of said transistors to one of the electrodes of the first of said transistors; and diode means commonly connecting the remaining electrode of each of said transistors to said source, said diode means being poled for easy current flow of the major current through the remaining of said electrodes of said transistors.

3. A bistable transistor multivibrator for operation in an extensive frequency range independently of ambient temperature, comprising a pair of transistors of like conductivity each including a base electrode, an emitter electrode, and a collector; a source of unidirectional operating current; a load connected to each of said collectors; resistor means connecting the collector of a first of said transistors to the base electrode of the other of said transistors; resistor circuit means connecting the collector of the other said transistor to the base electrode of the first of said transistors; and diode means commonly connecting the emitter electrode of each of said transistors to said source, said diode means being poled for easy current flow of the forward current through the emitter electrodes of said transistors.

References Cited in the file of this patent

UNITED STATES PATENTS

| | | |
|---|---|---|
| 2,847,583 | Lin | Aug. 12, 1958 |
| 2,909,675 | Edson | Oct. 20, 1959 |
| 2,927,242 | Shultz | Mar. 1, 1960 |
| 2,954,532 | Pentecost et al. | Sept. 27, 1960 |

OTHER REFERENCES

Electronics, November 1956, pp. 178–181, "Three New Transistor Circuits," Hekimian.

UNITED STATES PATENT OFFICE

CERTIFICATE OF CORRECTION

Patent No. 3,017,524

January 16, 1962

Harold S. Koletsky et al.

It is hereby certified that error appears in the above numbered patent requiring correction and that the said Letters Patent should read as corrected below.

Column 4, line 23, for "transistor 12" read -- transistor 14 --.

Signed and sealed this 24th day of July 1962.

(SEAL)
Attest:

ERNEST W. SWIDER
Attesting Officer

DAVID L. LADD
Commissioner of Patents